(12) United States Patent
Esayian et al.

(10) Patent No.: US 10,360,584 B2
(45) Date of Patent: *Jul. 23, 2019

(54) SYSTEM AND METHOD FOR DIRECT RESPONSE ADVERTISING

(71) Applicant: DIRECT PATH, LLC, Rancho Santa Fe, CA (US)

(72) Inventors: Nicholas Esayian, Racho Santa Fe, CA (US); Jay Christopher Schirmacher, San Diego, CA (US)

(73) Assignee: Direct Path LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,429

(22) Filed: Apr. 28, 2015

(65) Prior Publication Data

US 2016/0232596 A1 Aug. 11, 2016

Related U.S. Application Data

(60) Provisional application No. 62/112,316, filed on Feb. 5, 2015.

(51) Int. Cl.
*G06Q 30/02* (2012.01)
*G06Q 30/06* (2012.01)

(52) U.S. Cl.
CPC ..... *G06Q 30/0245* (2013.01); *G06Q 30/0242* (2013.01); *G06Q 30/0261* (2013.01); *G06Q 30/0269* (2013.01); *G06Q 30/0272* (2013.01); *G06Q 30/0273* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 6,990,453 | B2 | 1/2006 | Wang et al. |
| 7,346,512 | B2 | 3/2008 | Li Chun Wang et al. |
| 7,359,889 | B2 | 4/2008 | Wang et al. |
| 7,565,139 | B2 | 7/2009 | Neven, Sr. et al. |
| 7,627,477 | B2 | 12/2009 | Wang et al. |
| 7,751,805 | B2 | 7/2010 | Neven |
| 7,865,368 | B2 | 1/2011 | Li-Chun Wang et al. |

(Continued)

OTHER PUBLICATIONS

Vidya Venkatachalam et. al, "Automatic identification of sound recordings," IEEE Signal Processing Magazine (Year: 2004).*

(Continued)

*Primary Examiner* — Sam Refai
*Assistant Examiner* — Rashida R Shorter
(74) *Attorney, Agent, or Firm* — Tsircou Law, P.C.

(57) ABSTRACT

Systems and methods to guide a user response to advertising determine and/or obtain information identifying a commercial good that is related to an advertisement presented to a user, and further determine and/or obtain commercial sources for that commercial good. Information regarding the particular commercial sources is used to select a commercial source. Information regarding the particular commercial good and the selected commercial source is presented to the user, for example using a graphical user interface. The user may subsequently be able to buy the commercial good from the selected commercial source.

11 Claims, 4 Drawing Sheets

(56) References Cited

U.S. PATENT DOCUMENTS

| | | |
|---|---|---|
| 7,986,913 B2 | 7/2011 | Wang |
| 8,041,338 B2 | 10/2011 | Chen |
| 8,041,734 B2 | 10/2011 | Mohajer et al. |
| 8,086,171 B2 | 12/2011 | Wang et al. |
| 8,238,951 B2 | 8/2012 | McGary |
| 8,418,919 B1 | 4/2013 | Beyda |
| 8,452,586 B2 | 5/2013 | Master et al. |
| 8,473,283 B2 | 6/2013 | Master et al. |
| 8,484,842 B2 | 7/2013 | Master et al. |
| 8,571,937 B2 | 10/2013 | Rose et al. |
| 8,688,253 B2 | 4/2014 | Master et al. |
| 8,694,534 B2 | 4/2014 | Mohajer |
| 8,725,559 B1 | 5/2014 | Kothari et al. |
| 8,798,322 B2 | 8/2014 | Boncyk et al. |
| 8,997,131 B1 | 3/2015 | Velummylum et al. |
| 9,226,042 B1 | 12/2015 | Kramer et al. |
| 9,332,284 B1 | 5/2016 | Taylor |
| 9,516,470 B1 | 12/2016 | Scofield et al. |
| 9,530,152 B2 | 12/2016 | Kramer et al. |
| 9,548,053 B1 | 1/2017 | Basye et al. |
| 2006/0161553 A1 | 7/2006 | Woo |
| 2007/0299671 A1* | 12/2007 | McLachlan .............. G10L 17/26 704/500 |
| 2009/0012867 A1* | 1/2009 | Lerman .................. G06Q 30/00 705/14.47 |
| 2010/0122283 A1 | 5/2010 | Button |
| 2010/0260426 A1 | 10/2010 | Huang et al. |
| 2012/0150750 A1 | 6/2012 | Law et al. |
| 2013/0185157 A1* | 7/2013 | Shihadah et al. .......... 705/14.64 |
| 2013/0191250 A1 | 7/2013 | Bradley et al. |
| 2013/0282532 A1* | 10/2013 | Shihadah ........... G06Q 30/0641 705/27.1 |
| 2014/0058812 A1 | 2/2014 | Bender et al. |
| 2014/0074607 A1 | 3/2014 | Shkedi |
| 2014/0129322 A1 | 5/2014 | George et al. |
| 2014/0259034 A1 | 9/2014 | Terrazas |
| 2014/0359644 A1 | 12/2014 | Kumar et al. |
| 2014/0372228 A1 | 12/2014 | Paz-Pujalt |
| 2017/0013313 A1* | 1/2017 | Mallinson ......... G06F 17/30026 |

OTHER PUBLICATIONS https://books.google.com/books?isbn=3940862215, 'Waiting for Bookland': interim report of the Joint Working Party. London: Booksellers Association of Great Britain and Ireland, 1979. 55 p. ISBN 0-901690-54-6.

* cited by examiner

SYSTEM AND METHOD FOR DIRECT RESPONSE ADVERTISING

FIELD

The disclosure relates to systems and methods for guiding a user response to advertising for goods and/or services and, in particular, presenting a user interface to a user on a client computing platform that provides information about and/or offers to sell the advertised goods and/or services.

BACKGROUND

Users can access online services, applications, and web pages via the internet, for example through client computing platforms. Information from televisions, radios, computers, and/or other presentation devices and/or sound-producing devices may be presented to users. Such information may include advertisements for goods and/or services. Online services, web pages, and/or applications may include information about goods and/or services. Online services, web pages, and/or applications may provide the ability for users to purchase goods and/or services. Information may be presented to client computing platforms that are connected to the internet. Using a browser software application to present a web page and/or other information on a client computing platform is known. Hosting information, for example information organized in a database, through a server is known. A server may access another server in the process of presenting information to a client computing platform.

SUMMARY

One aspect of the disclosure relates to systems configured to provide and/or respond to advertising, and/or to guide a user response to advertising. The system may facilitate interaction between users and service providers, online services, servers (including but not limited to search servers, ad servers, demand-side platforms, and/or other servers), commercial sources, public and/or commercial databases, external resources, third-party ad-brokers, third-party platforms, demand-side platforms, and/or other entities, which may collectively be referred to as commercial providers. The system may facilitate interaction between different commercial providers. The system and/or any entities that interact with the system may be deployed using a (public) network and/or using commercial web services. The system may facilitate interaction involving users, for example through client computing platforms (also referred to herein as computing devices).

Advertising may become increasingly valuable and/or effective if users' effort to respond to an advertisement, e.g. through a purchase, is reduced. Advertising may become increasingly valuable and/or effective if it is tailored to its intended audience. Advertising may become increasingly valuable and/or effective if the advertised goods and/or services are likely to meet a demand or need of its intended audience. Advertising may be either off-line (e.g. through paper mail), broadcast (e.g. through radio or television), or online, e.g. delivered as (digital) content to client computing platforms. Different kinds or modalities of advertising may have different kinds of characteristics and qualities, such that common techniques in one context may not be available or practicable in another context, and/or may be refined or changed for increased value to advertisers in another context or modality.

Advertising may be improved if detailed information regarding the intended audience is available. For example, the system may be able to determine (e.g. based on information about a particular computing device's connectivity with servers) a geographical area that has the highest likelihood of coinciding with the location of a particular computing device, and thus its associated user. For example, the geographical area may coincide with a town, city, and/or community. For example, a website may be able to gather information associated with a particular computing device, including but not limited to a zip code, time zone, preferred language, latitude information, longitude information, global positioning system (GPS) information, Universal Transverse Mercator (UTM) information, and/or other user-specific and/or device-specific information. Such information may be stated by a user and/or derived in other ways.

By virtue of the functionality described in this disclosure, users may easily and quickly respond to advertising presented to users, in proximity of users, and/or in proximity of client computing platforms associated with users. In some embodiments, the client computing platforms may capture and/or receive information (including but not limited to audio, video, text, animation, images, and/or combinations thereof). In some embodiments, the client computing platforms obtain and/or determine an advertisement for a commercial good based on this information. As used herein, the term "commercial good" may include any goods, services, and/or combinations thereof that may be exchanged and/or provided in exchange for value.

In some embodiments, the client computing platforms may obtain and/or determine a commercial source for the commercial good. Commercial sources may provide information related to commercial goods, information related to offers to sell commercial goods, and/or offers to sell commercial goods. By way of non-limiting example, a commercial source may be a retailer, online retailer, store, warehouse, commercial website, service provider, and/or other entity offering commercial goods for sale and/or for other types of exchange of value.

In some embodiments, the client computing platforms may provide the ability for users to purchase the commercial good. Any functionality attributed in this disclosure to client computing platforms may be performed by multiple client computing platforms operating in coordination, by the system described in this disclosure and/or any component thereof, by one or more servers, and/or any combination thereof (e.g., "in the cloud", and/or other virtualized processing solutions).

As used herein, the term "determine" (and derivatives thereof) may include measure, calculate, compute, estimate, approximate, generate, and/or otherwise derive, and/or any combination thereof. As used herein, the term "obtain" (and derivatives thereof) may include active and/or passive retrieval, determination, derivation, transfer, upload, download, submission, and/or exchange of information, and/or any combination thereof.

Through the functionality of the system described in this disclosure, valuable information regarding users may be gathered. For example, this information may be used for targeted advertising, promotional activities, and/or other purposes. For example, this information may be used, e.g. after being sold to a demand-side platform, to provide targeted advertising. Advertising may be targeted, e.g., to users and/or devices. Targeted advertising may be of interest to commercial entities, including but not limited to ad servers, search servers, third-party ad brokers, third-party platforms, and/or other commercial entities involved in buying or selling advertisements on the internet. In some embodiments, third-party platforms may include one or more demand-side platforms.

The system may include one or more servers, one or more physical processors, physical electronic storage, one or more presentation devices, one or more sound-producing devices, and/or other components. The system may further be configured to communicate with, by way of non-limiting example, one or more commercial providers, client computing platforms that are associated with users, and/or other entities described in this disclosure. Individual users may interact, e.g. through browser software applications being executed on client computing platforms, with servers and/or other components of the system.

Presentation devices may be configured to present information to users. The information may include one or more of audio, video, text, animation, images, and/or combinations thereof. Presentation devices may include, by way of non-limiting example, radio, television, client computing platforms, displays, monitors, sound systems, public announcement systems, and/or other devices that present audio and/or video to one or more users.

Sound-producing devices may be configured to present information to users, in particular information including sound. The information may include one or more of audio, video, text, animation, images, and/or combinations thereof. Sound-producing devices may include, by way of non-limiting example, radio, television, client computing platforms, displays, monitors, sound systems, public announcement systems, and/or other devices that present audio and/or video to one or more users.

The processors may be configured via computer readable instructions to execute computer program components. The computer program components may include an information component, an advertisement component, a source parameter component, a source component, a selection component, a presentation component, a purchase component, a tracking component, a compensation component, a user parameter component, and/or other components.

The information component may be configured to obtain, receive, and/or determine information based on captured sound, captured images, and/or other captured information. Alternatively, and/or simultaneously, the information component may be configured to obtain, receive, and/or determine information identifying an advertisement for a commercial good. Alternatively, and/or simultaneously, the information component may be configured to obtain, receive, and/or determine information identifying a commercial good. For example, the obtained, received, and/or determined information may be embedded in the captured information. For example, the captured sound may be captured through a microphone. For example, the microphone may be included in (and/or operate in conjunction with) a client computing platform. For example, the identified commercial good may have been presented to a user and/or presented in proximity of a client computing platform. The client computing platform may be associated with a particular user. Alternatively, and/or simultaneously, the captured information may be captured through a camera. For example, the camera may be included in (and/or operate in conjunction with) a client computing platform. The information obtained, received, and/or determined by the information component may include streaming audio and/or video information. In some embodiments, the information obtained, received, and/or determined by the information component may include processed information (e.g. determined by processing the captured sound) that was processed by a client computing platform.

In some embodiments, the information obtained, received, and/or determined by the information component may have been presented to a user, have been presented in proximity of a user, have been presented in proximity of a client computing platform associated with a user, and/or other presented in a way that a user was aware of and/or may have been aware of. As used in the context of this disclosure, the term "proximity" may refer to a distance small enough such that information may be transferred intelligibly. For example, proximity to a user may refer to a distance small enough such that the user can see, hear, and/or understand the transferred information. For example, proximity to a client computing platform may refer to a distance small enough such that the client computing platform (e.g. through a microphone, camera, and/or capturing device) can capture transferred information such that the signal-to-noise ratio of the captured information is good enough for one or more of the types of processing to be successfully performed as described in this disclosure. For example, the obtained, received, and/or determined information may be embedded in the presented information.

The source parameter component may be configured to obtain, receive, and/or determine information associated with commercial sources. In some embodiments, the source parameter component may be configured to obtain, receive, and/or determine source parameters associated with individual commercial sources. By way of non-limiting example, source parameters may include geographical information related to a commercial source, geographical information related to a particular commercial good for sale through a commercial source, parameters specific to a commercial source (hereinafter "commercial source-specific parameters"), parameters specific to a commercial good for sale through a commercial source (hereinafter "commercial good-specific parameters"), and/or other parameters. By way of non-limiting example, commercial source-specific parameters may include shipping-related parameters, shipping costs, shipping speeds, shipping methods, tax-related parameters, amount of prospective compensation from a commercial source, and/or other commercial source-specific parameters. By way of non-limiting example, commercial good-specific parameters may include price, tax, shipping-related parameters, amount of prospective compensation for providing information related to a particular commercial good, amount of prospective compensation for effectuating a purchase of a particular commercial good, and/or other commercial good-specific parameters.

The advertisement component may be configured to determine advertisements for commercial goods, including but not limited to determinations that are based on particular information obtained, received, and/or determined by the information component. In some embodiments, the particular information may be embedded in information presented to users. In some embodiments, the particular information may include a stream or clip of audio. The advertisement component may be configured to determine an acoustic fingerprint based on the particular information. By way of non-limiting example, the technology used to match audio clips or fragments to particular advertisements may be similar to the technology used by Shazam™ to identify songs based on an audio clip[1].

[1] See http://www.ee.columbia.edu/~dpwe/papers/Wang03-shazam.pdf

For example, a sound clip may be converted to a time-frequency representation. Based on extreme values in this domain (e.g. for power at a particular frequency), an acoustic fingerprint for the sound clip may include characteristics that correspond to those extreme values. In some embodiments, a set of potentially extreme values that are included in the acoustic fingerprint may be referred to as a constellation. In some embodiments, processing and/or operations performed on the sounds clips may be done "locally" on the client computing platform 14 that is associated with the user. In some embodiments, processing and/or operations performed on the sounds clips may be done on one or more (external) servers. Combinations of these approaches, in which at least some of the processing and/or operations are performed by different physical entities, are envisioned within the current scope in this disclosure. The advertisement component may be configured to match the determined acoustic fingerprint against a database of acoustic fingerprints. Acoustic fingerprints in the database may correspond to advertisements. Advertisements may correspond to commercial goods. The advertisement component may be configured to determine a match for the acoustic fingerprint and/or a likelihood that a match is accurate. A matching acoustic fingerprint may correspond to a particular advertisement and/or a particular commercial good. Any functionality attributed in this disclosure to a particular computer program component may be performed by multiple computer program components operating in coordination, by the system described in this disclosure and/or any component thereof, by one or more servers, and/or any combination thereof (e.g., "in the cloud", and/or other virtualized processing solutions). For example, control and operation of a database of acoustic fingerprints may be performed by an external resource, e.g. as an online service or online application. For example, control and operation of a database relating advertisements to commercial goods and/or vice versa may be performed by an external resource, e.g. as an online service or online application.

As used herein, any association (or correspondency) involving users, client computing platforms, advertisements, commercial goods, commercial sources, acoustic fingerprints, representations of commercial goods, databases, compensations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

The source component may be configured to determine commercial sources of commercial goods. For example, a particular commercial good may be offered for sale by one or more online retailers and/or other commercial sources. Determinations by the source component may be based on a variety of factors, including but not limited to price, availability, geographic location, time of day, user-preferences, internal system preferences, source parameters, user parameters, and/or other factors.

The selection component may be configured to select one or more commercial sources from a set of commercial sources. Selection by the selection component may be based on a variety of factors, including but not limited to price, availability, geographic location, time of day, user-preferences, internal system preferences, source parameters, user parameters, factors based on recommendations, references, and/or endorsements obtained through social networking (e.g. from friends, or people followed by a user), and/or other factors. In some embodiments, selection by the selection component may be based on source parameters associated with individual commercial sources. For example, selection by the selection component may be based on comparisons with one or more selection criteria. For example, selection by the selection component may be based on analysis of source parameters with regard to selection criteria. The parameters used by the selection component may be obtained from, received from, and/or determined by other computer program modules, including but not limited to the source parameter component, the user parameter component, and/or other components.

For example, an internal system preference for the selection component may be based on the compensation structure and/or incentive structure in place with different commercial sources. For example, if two commercial sources offer a commercial good at the same price, the system may favor and/or select the commercial source having the higher compensation for providing a lead or sale. In some embodiments, determinations of commercial sources for commercial goods may be implemented using a database. Commercial goods in the database may correspond to commercial sources and/or vice versa. For example, control and operation of a database of commercial sources and/or commercial goods may be performed by an external resource, e.g. as an online service or online application.

The presentation component may be configured to effectuate presentations of user interfaces to users. User interfaces may be presented on client computing platforms. The user interfaces may include representations of commercial goods, e.g. through icons, text, images, and/or combinations thereof. In some embodiments, representations of commercial goods may be associated with commercial sources. In some embodiments, the represented commercial goods may correspond to advertisements including but not limited to the advertisements as determined by the advertisement component. In some embodiments, the user interfaces may provide information related to commercial goods. In some embodiments, the user interfaces may provide offers for users to purchase commercial goods from commercial sources and/or for commercial sources to sell commercial goods to users. In some embodiments, the presentation component may provide the ability for users to purchase commercial goods within the system described in this disclosure. In some embodiments, the presentation component may be configured to redirect and/or link users to external web pages and/or applications that provide the ability for users to purchase commercial goods. In some embodiments, combinations of in-system purchasing and external purchasing may provide the ability for users to purchase commercial goods.

The purchase component may be configured to effectuate purchases of commercial goods by users. In some embodiments, operation of the purchase component may be performed in response to receipt of user input interacting with a user interface of a client computing platform. In some embodiments, operation of the purchase component may include a payment solution, i.e. the ability to complete a financial transaction. In some embodiments, the purchase component may be configured to collect payments from users.

In some embodiments, the purchase component may provide the ability for users to effectuate purchases within the system described in this disclosure. In some embodiments, the purchase component may be configured to redirect and/or link users to external web pages and/or applications that provide the ability for users to effectuate purchases. In some embodiments, combinations of in-system purchasing and external purchasing may provide the ability for users to effectuate purchases and/or receive information about particular commercial goods.

The tracking component may be configured to track, record, analyze, and/or process information regarding advertisements, including but not limited to occurrences of the presentation of an advertisement to a user and/or occurrences of the presentation of an advertisement in a client computing platform. In some embodiments, the tracking component may be configured to track, record, analyze, and/or process information regarding the operation of the presentation component, the purchase component, and/or other components of the system. For example, the tracking component may be configured to track redirections from the user interface to external web pages and/or applications that provide the ability for users to purchase commercial goods.

The compensation component may be configured to track, record, analyze, and/or process purchase information, including but not limited to information regarding purchases that are offered and/or completed through the system. In some embodiments, the compensation component may be configured to determine compensations for any of the operations performed by the system, including but not limited to the operations tracked by the tracking component. For example, the compensation component may be configured to determine a compensation for determining a particular commercial source as the commercial source for a particular commercial good.

In some embodiments, the compensation component may be configured to produce bills, invoices, payments, and/or other financial documents and/or messages to initiate the collection of payments and/or the disbursement of payments based on the determined compensations. The compensation component may be configured to produce, generate, and/or transmit financial documents to initiate the distribution of payments based on the determined compensations for, e.g., commercial providers.

The user parameter component may be configured to obtain, receive, and/or determine user parameters associated with users and/or client computing platforms. An individual client computing platform may be associated with a user. The user parameters may be used by other computer program components, including, but not limited to the selection component. The user parameters may include one or more of user-specific parameters, geographical information related to a user, a current geographical location of a user, a home location of a user, a work or professional location of a user, a school or leisure-related location of a user, a combination of multiple locations of a user, a time zone of a user, demographic information of a user, stated user preferences, stated user dislike, derived user preferences, purchase history of a user, information related to age, gender, address, zip code, time zone, income level, education level, employment, professional status, family status, personal information, professional information, social media information, racial information, detected language preference, stated language preference, and/or parameters.

The system may include one or more servers. The server(s) may be configured to communicate with one or more client computing platforms. The server(s) may be configured to communicate according to a client/server architecture, and/or according other architectures. The servers may include search servers, ad servers, ad brokers, demand-side platforms, third-party platforms, and/or other servers.

The server(s) may include physical electronic storage, one or more processors, and/or other components. The server(s) may be configured to execute one or more computer program components. Physical electronic storage may be referred to as electronic storage.

The system may include one or more client computing platforms. Client computing platforms may include one or more processors configured to execute computer program components. The computer program components may be configured to enable a user associated with a client computing platform to interact with the system, any component thereof, other client computing platforms, and/or provide other functionality attributed herein to client computing platforms. By way of non-limiting example, client computing platforms may include one or more of a desktop computer, a laptop computer, a handheld computer, a NetBook, a Smartphone, a tablet, a mobile computing platform, a gaming console, a television, a smart watch, a device for streaming internet media, and/or other computing platforms. The term client computing platform may be used interchangeably with the term computing device.

Functionality supported by commercial providers may include the provision of advertisements, web pages, (mobile) applications, apps, stand-alone applications, desktop applications, and/or other types of software applications capable of interacting with a network, for example the internet. As used herein, information and/or functionality provided through any type of software application capable of interacting with a network may be referred to as web pages (including, but not limited to, mobile applications—or apps).

Web pages may be rendered, interpreted, and/or displayed for presentation using a computing platform, such as a client computing platform. As used herein, displaying information through a mobile application—or app—is included in the term presentation. Presentation of web pages may be supported through a display, screen, monitor of the computing platform, and/or projection by the computing platform. Web pages may be accessible from a local computing platform (e.g. not currently connected to the internet) and/or hosted by a remote web server (e.g. connected to the internet and/or one or more other networks). Web pages may be accessed through a browser software application being executed on a computing platform. As used herein, mobile applications may be included in the term browser software application. Web pages may be static (e.g. stored using electronic storage that is accessible by a web server), dynamic (e.g. constructed when requested), and/or a combination of both. The browser software application may be configured to render, interpret, and/or display one or more web pages for presentation using a computing platform. The digital content included in a web page may have been provided by one or more commercial providers. A set of linked and/or organized web pages may form a website. A website may include a set of related and/or linked web pages hosted on one or more web servers and accessible via a network, e.g. the internet. Websites and/or web pages may be accessible through an address called a uniform resource locator (URL).

The servers may include one or more demand-side platforms. A demand-side platform may be configured to provide a market, auction-house, and/or exchange pertaining to advertising, e.g. online advertising. In some embodiments, a demand-side platform provides ad exchange accounts and/or data exchange accounts for advertisers. In some embodiments, a demand-side platform enables (real-time) bidding for displaying online ads. In some embodiments, a demand-side platform may issue and/or transmit a request for and/or invitation to acquire information. The information may pertain to one or more particular users, one or more particular user identifiers that identify particular users, one or more particular devices, one or more particular device identifiers, one or more particular commercial goods, and/or other particular entities.

The servers may include one or more search servers. A search server may host a website that that allows users to interact and/or engage with (searchable) information. Users may interact through user interfaces that are displayed and/or presented on client computing platforms. Information related to entered queries may be processed, analyzed, recorded, packaged, offered for sale, exchanged, combined with other information, and/or sold. In response to a web search query from a particular user through a particular client computing platform, a search server may provide access to and/or present one or more digital media files, e.g. through one or more web pages. The one or more web pages may be presented (or displayed for presentation) to the particular user by a browser software application that is being run or executed on the particular client computing platform. As used herein, the term "files" may include digital files of a fixed and/or predetermined length or size, streams of digital information, and/or combinations thereof. By way of non-limiting example, streams of digital information may include music (e.g. radio), podcasts, video, and/or other streams of information.

An ad server may host and/or provide digital content, usually of a commercial nature and usually to other servers, to be presented for display on client computing platforms. The presentation of digital content may occur in conjunction with the presentation of one or more digital media files, web pages, and/or other digital content used by commercial providers. The digital content may include one or more of advertisements, coupons, offers, sales information, branding information, and/or other information related to commercial goods. The types of information hosted and/or provided by an ad server may jointly be referred to as "ads" or "advertisements" throughout this disclosure.

The functionality of the system is not intended to be limited by any of the examples herein. It is contemplated that information and/or results from any component of the system may be used in any other component, combined with information and/or results from any component, and so forth.

These and other objects, features, and characteristics of the servers, systems and/or methods disclosed herein, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of any limits. As used in the specification and in the claims, the singular form of "a", "an", and "the" include plural referents unless the context clearly dictates otherwise. As used in the specification and in the claims, in a list of items that includes the separator "and/or", combinations of those items, insofar as practically possible, are envisioned as embodiments.

DETAILED DESCRIPTION

Figure 1:
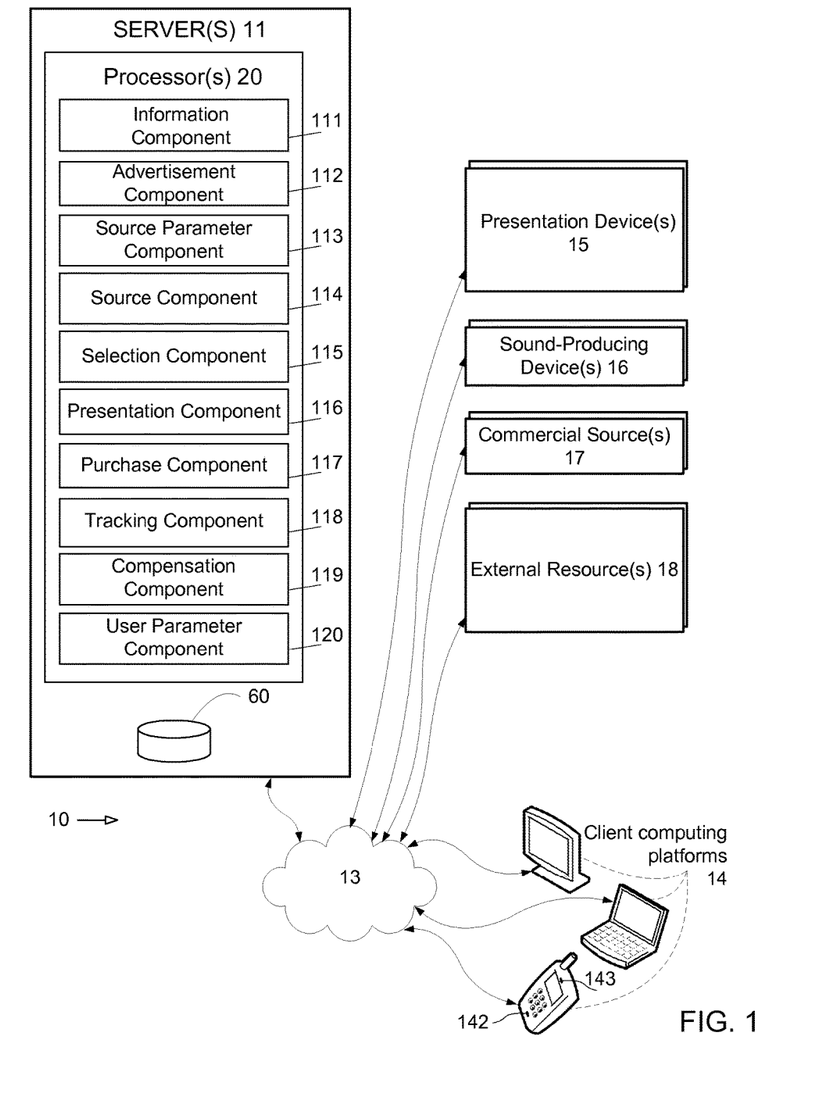
FIG. 1 illustrates a system configured to provide responses to advertising, in accordance with one or more embodiments.

FIG. 1 illustrates a system 10 configured to provide and/or respond to advertising, e.g. on a network 13. In some embodiments, network 13 may be the internet and/or one or more other networks, e.g. public networks. System 10 may include one or more servers 11, one or more processors 20, electronic storage 60, one or more computer program components, one or more presentation devices 15, one or more sound-producing devices 16, one or more commercial sources 17, one or more external resources 18, one or more client computing platforms 14, and/or other components. System 10 may facilitate interaction between users and service providers, online services, servers, commercial sources 17, public and/or commercial databases, external resources 18, third-party ad-brokers, third-party platforms, demand-side platforms, and/or other entities, which may collectively be referred to as commercial providers.

System 10 may facilitate interaction between different commercial providers. System 10 and/or any entities that interact with system 10 may be deployed using a (public) network and/or using commercial web services. System 10 may facilitate interaction involving users, for example through client computing platforms 14 (also referred to herein as computing devices). Users may be associated with client computing platforms 14, and/or vice versa. External resources 18 may include one or more demand-side platforms, ad servers, search servers, service providers, online services, public and/or commercial databases, servers, and/or other entities.

The components in FIG. 1 may be communicatively coupled through one or more networks 13, including but not limited to the Internet. In some embodiments, one or more of the processors 20, electronic storage 60, and/or other components may be included in server 11.

Digital content, for example digital media files containing image data and/or other information, may be presented for display to users on client computing platforms 14 associated with those users. Individual users may request and/or view one or more digital media files through a website or web-based system. The website, its web pages, the web-based system, and/or the digital media files associated therewith, may be accessed by users, for example through browser software applications being executed on client computing platforms 14.

Advertising may become increasingly valuable and/or effective if the effort required from a user to respond to an advertisement, e.g. through a purchase, is reduced. Advertising may become increasingly valuable and/or effective if it is tailored to its intended audience. Advertising may become increasingly valuable and/or effective if the advertised goods and/or services are likely to meet a demand or need of its intended audience. Advertising may be either off-line (e.g. through paper mail), broadcast (e.g. through radio or television), online (e.g. delivered as content to client computing platforms), and/or using a different modality or combination of modalities. Different kinds or modalities of advertising may have different kinds of characteristics and qualities, such that common techniques in one context may not be available or practicable in another context, and/or may be refined or changed for increased value to advertisers in another context or modality.

Advertising may be improved if detailed information regarding the intended audience is available. For example, system 10 may be able to determine (e.g. based on information about a particular computing device's connectivity with servers) a geographical area that has the highest likelihood of coinciding with the location of a particular computing device 14, and thus its associated user. For example, the geographical area may coincide with a town, city, and/or community. For example, a website may be able to gather information associated with a particular computing device 14, including but not limited to a zip code, time zone, preferred language, and/or other user-specific and/or device-specific information. Such information may be stated by a user and/or derived in other ways. Determination of geographical information may be based, by way of non-limiting example, on latitude information, longitude information, global positioning system (GPS) information, Universal Transverse Mercator (UTM) information, cell tower information, internet protocol (IP) address lookup, and/or other information.

By virtue of the functionality described in this disclosure, users may easily and quickly respond to advertising presented to users, in proximity of users, and/or in proximity of client computing platforms 14 associated with users. In some embodiments, client computing platforms 14 may capture and/or receive information (including but not limited to audio, video, text, animation, images, and/or combinations thereof). In some embodiments, client computing platforms 14 may obtain and/or determine an advertisement for a commercial good based on this information. In some embodiments, client computing platforms 14 may obtain and/or determine a commercial source for the commercial good. In some embodiments, client computing platforms 14 may provide the ability for users to purchase the commercial good. Any functionality attributed in this disclosure to client computing platforms 14 may be performed by multiple client computing platforms 14 operating in coordination, by system 10 and/or any component thereof, by one or more servers 11, and/or any combination thereof (e.g., "in the cloud", and/or other virtualized processing solutions).

Through the functionality of system 10, valuable information regarding users may be gathered. For example, this information may be used for targeted advertising, promotional activities, and/or other purposes. For example, this information may be used, e.g. after being sold to a demand-side platform, to provide targeted advertising. Advertising may be targeted, e.g., to users and/or devices. Targeted advertising may be of interest to commercial entities, including but not limited to ad servers, search servers, third-party ad brokers, third-party platforms, and/or other commercial entities involved in buying or selling advertisements on the internet. In some embodiments, third-party platforms may include one or more demand-side platforms.

System 10 may include one or more servers 11, one or more physical processors 20, physical electronic storage 60, one or more presentation devices 15, one or more sound-producing devices 16, and/or other components. System 10 may further be configured to communicate with, by way of non-limiting example, one or more commercial providers, client computing platforms 14 that are associated with users, and/or other entities described in this disclosure. Individual users may interact, e.g. through browser software applications being executed on client computing platforms 14, with servers 11 and/or other components of system 10.

Presentation devices 15 may be configured to present information to users. The information may include one or more of audio, video, text, animation, images, and/or combinations thereof. Presentation devices 15 may include, by way of non-limiting example, radio, television, client computing platforms 14, displays, monitors, sound systems, public announcement systems, and/or other devices that present audio and/or video to one or more users.

Sound-producing devices 16 may be configured to present information to users, in particular information including sound. The information may include one or more of audio, video, text, animation, images, and/or combinations thereof. Sound-producing devices 16 may include, by way of non-limiting example, radio, television, client computing platforms 14, displays, monitors, sound systems, public announcement systems, and/or other devices that present audio and/or video to one or more users.

Processors 20 may be configured via computer readable instructions to execute computer program components. The computer program components may include an information component 111, an advertisement component 112, a source component 114, a presentation component 116, a purchase component 117, a tracking component 118, a compensation component 119, and/or other components.

Information component 111 may be configured to obtain, receive, and/or determine information based on captured sound, captured images, and/or other captured information (e.g. video). Alternatively, and/or simultaneously, information component 111 may be configured to obtain, receive, and/or determine information identifying an advertisement for a commercial good. Alternatively, and/or simultaneously, information component 111 may be configured to obtain, receive, and/or determine information identifying a commercial good. For example, the captured sound may be captured through a microphone 142. For example, microphone 142 may be included in (and/or operate in conjunction with) client computing platform 14. For example, the identified commercial good may have been presented to a user and/or presented in proximity of client computing platform 14. Client computing platform 14 may be associated with a particular user. Alternatively, and/or simultaneously, the captured information may be captured through a camera 143. For example, the camera may be included in (and/or operate in conjunction with) client computing platform 14. Note that this particular client computing platform 14 may not be the source for the captured sound, the captured image, the captured video, and/or other captured information, which may for example be generated by sound-producing device 16, presentation device 15, and/or one or more other devices.

The information obtained, received, and/or determined by information component 111 may include streaming audio and/or video information. In some embodiments, the information obtained, received, and/or determined by information component 111 may include processed information (e.g. determined by processing the captured sound or image) that was processed by client computing platform 14. For example, a captured image or captured video may have been captured by and/or stored on client computing platform, e.g. through camera 143. In some embodiments, the information obtained, received, and/or determined by information component 111 may include wirelessly transmitted information from a sound-producing device 16, a presentation device 15, an external resource 18, and/or another source. For example, information may be wirelessly transmitted (by a component of a car's entertainment system) to a client computing platform 14 that happens to be inside the car. This kind of wireless transmission of information may, in some embodiments, not require audio signals, and/or not include audio signals. For example, the client computing platform may receive information packets through Bluetooth™ and/or other communication mechanisms that include information about advertisements, commercial goods, commercial sources, and/or other pertinent information.

In some embodiments, the information obtained, received, and/or determined by information component 111 may have been presented to a user, have been presented in proximity of a user, have been presented in proximity of client computing platform 14 associated with a user, and/or otherwise presented in a way that a user was aware of and/or may have been aware of. In some embodiments, operation of information component 111 and/or system 10 may be controlled by a user who can turn components and/or system 10 on or off at will. In some embodiments, responsive to a user turning components and/or system 10 on, the same components and/or system 10 may automatically be turned off after a predetermined span of time has passed. In some embodiments, responsive to a user turning components and/or system on, the same components and/or system 10 may be active indefinitely, performing the operations described in this disclosure.

Source parameter component 113 may be configured to obtain, receive, and/or determine information associated with commercial sources 17. In some embodiments, source parameter component 113 may be configured to obtain, receive, and/or determine source parameters associated with individual commercial sources 17.

Advertisement component 112 may be configured to determine advertisements for commercial goods, including but not limited to determinations that are based on particular information obtained, received, and/or determined by information component 111. In some embodiments, the particular information may include a stream or clip of audio. Advertisement component 112 may be configured to determine an acoustic fingerprint based on the particular information. By way of non-limiting example, the technology used to match audio clips or fragments to particular advertisements may be similar to the technology used by Shazam™ to identify songs based on an audio clip. Alternatively, and/or simultaneously, audio clips or fragments may include embedded information, e.g. through embedded tone and/or other marks that may be used to identify songs, advertisements, and/or other information. Advertisement component 112 may be configured to match the determined acoustic fingerprint against a database of acoustic fingerprints. Acoustic fingerprints in the database may correspond to advertisements. Advertisements may correspond to commercial goods. Advertisement component 112 may be configured to determine a match for the acoustic fingerprint and/or a likelihood that a match is accurate. In some embodiments, advertisement component 112 may be configured to determine which entry in a database is the best match for a particular acoustic fingerprint. A matching acoustic fingerprint may correspond to a particular advertisement and/or a particular commercial good. Any functionality attributed in this disclosure to a particular computer program component may be performed by multiple computer program components operating in coordination, by system 10 and/or any component thereof, by one or more servers 11, and/or any combination thereof (e.g., "in the cloud", and/or other virtualized processing solutions). For example, control and operation of a database of acoustic fingerprints may be performed by an external resource, e.g. as an online service or online application. For example, control and operation of a database relating advertisements to commercial goods and/or vice versa may be performed by an external resource 18, e.g. as an online service or online application.

In some embodiments, the operation of advertisement component 112 may include specialized databases, and/or multiple copies of databases. For example, databases may be specialized regarding one or more specific languages, one or more specific time zones, one or more specific geographical locations, and/or other distinguishing features of advertisements, client computing platforms, users, and/or other entities related to system 10. In some embodiments, the operation of advertisement component 112 may include one or more local databases, regional databases, city-wide databases, county-wide databases, state-wide databases, national databases, and/or other databases containing information (by way of non-limiting example, acoustic fingerprints of advertisements) used to make determinations as described herein. In some embodiments, the operation of advertisement component 112 may include multiple databases that are searched through at the same time. For example, each database may return the best match available, and advertisement component 112 may be configured to select among these options for the better match in light of some criterion (e.g. a likelihood metric).

Source component 114 may be configured to determine commercial sources 17 of commercial goods. For example, a particular commercial good may be offered for sale by one or more online retailers and/or other commercial sources 17. In some embodiments, commercial sources 17 as determined may be able to provide information related to one or more particular commercial goods, In some embodiments, commercial sources 17 as determined may provide information related to one or more particular commercial goods, In some embodiments, commercial sources 17 as determined may be able to provide information related to offers to sell one or more particular commercial goods, In some embodiments, commercial sources 17 as determined may provide information related to offers to sell one or more particular commercial goods, In some embodiments, commercial sources 17 as determined may offer to sell one or more particular commercial goods, Determinations by source component 114 may be based on a variety of factors, including but not limited to price, availability, geographic location, demographic information of the user, user-preferences, internal system preferences, and/or other factors.

Selection component 114 may be configured to select one or more commercial sources 17 from a set of commercial sources 17. Selection by selection component 114 may be based on a variety of factors, including but not limited to price, availability, geographic location, time of day, user-preferences, internal system preferences, source parameters, user parameters, and/or other factors. In some embodiments, selection by selection component 114 may be based on source parameters associated with individual commercial sources 17. For example, selection by selection component 17 may be based on comparisons with one or more selection criteria. For example, selection by selection component 17 may be based on analysis of source parameters with regard to selection criteria. The parameters used by selection component 114 may be obtained from, received from, and/or determined by other computer program modules, including but not limited to source parameter component 113, user parameter component 120, and/or other components.

In some embodiments, the selection criteria may include, by way of non-limiting example, one or more of source parameters, user parameters, stated user preferences for particular commercial sources 17, stated user dislike for particular commercial sources 17, obtained user preferences based on effectuated purchases through system 10, obtained user preferences based on effectuated selections of representations of commercial goods by a user in a user interface, purchase history of a user, amount of prospective compensation for providing information related to a particular commercial good, amount of prospective compensation for effectuating a purchase of a particular commercial good, demographic information of a user, and/or other criteria or parameters. For example, demographic information of a user may include information related to age, gender, address, zip code, time zone, income level, education level, employment, professional status, family status, personal information, professional information, social media information, racial information, detected language preference, stated language preference, and/or other demographic information.

For example, an internal system preference may be based on the compensation structure and/or incentive structure in place with different commercial sources. For example, if two commercial sources 17 offer a commercial good at the same price, system 10 may favor and/or select the commercial source 17 that has the higher compensation in comparison for providing a lead or sale. In some embodiments, determinations of commercial sources 17 for commercial goods may be implemented using a database. Commercial goods in the database may correspond to commercial sources 17 and/or vice versa. For example, control and operation of a database of commercial sources 17 and/or commercial goods may be performed by an external resource 18, e.g. as an online service or online application.

In some embodiments, one or more factors used by source component 114 as a basis for determinations may be obtained and/or determined by one or more external resources 18. For example, a factor may be the home location of a particular user, and/or the current location of a particular user. For example, a factor may be location of one or more commercial sources 17. For example, a factor may be a (detected) language of a particular advertisement. For example, a factor may be the current time zone of a particular user. In some embodiments, multiple factors may be combined. For example, a factor may be one or more preferences (e.g. for particular online retailers, or particular shipping methods/speeds, etc.) expressed by a particular user. In some embodiments, a user-preference such as a preferred online retailer may be weighed against a price differential between different online retailers. For example, if the price at the preferred online retailer is within a predetermined price differential threshold (e.g. of 10% of the lowest available price, or $2) when compared against the lowest available price, source component 114 may be configured to select the preferred online retailer. If the price differential exceeds the predetermined price differential threshold, source component 114 may be configured to select the online retailer that offers the lowest price, despite being different from the user-preferred online retailer. In some embodiments, differences in shipping prices may be considered by source component 114 when making determinations.

In some embodiments, the one or more factors used by source component 114 as a basis for determinations may include a factor related to the way in which different commercial sources 17 compensate and/or offer compensation and/or the level/amount of compensation for leads, redirections, and/or sales.

In some embodiments, the one or more factors used by source component 114 as a basis for determinations may include knowledge about what other advertisements, commercial goods, and commercial sources have previously been presented to the user. In some embodiments, prior activity within system 10 may provide context for the operation of the computer program modules. Alternatively, and/or simultaneously, prior activities and/or reactions by a user may provide context for the operation of the computer program modules. For example, a commercial source 17 from which a purchase was previously made by a particular user may be favored over another commercial source 17 (e.g. by source component 114). Any of the factors used by source component 114 may be used as the basis for presenting coupons and/or other incentives to users.

Presentation component 116 may be configured to effectuate presentations of user interfaces to users. User interfaces may be presented on client computing platforms 14. The user interfaces may include representations of commercial goods, e.g. through icons, text, images, and/or combinations thereof. In some embodiments, representations of commercial goods may be associated with commercial sources 17. In some embodiments, the represented commercial goods may correspond to advertisements including but not limited to the advertisements as determined by advertisement component 112. In some embodiments, the user interfaces may provide offers for users to purchase commercial goods from commercial sources 17 and/or for commercial sources 17 to sell commercial goods to users. In some embodiments, presentation component 116 may provide the ability for users to purchase commercial goods within system 10. In some embodiments, presentation component 116 may be configured to redirect and/or link users to external web pages and/or applications that provide the ability for users to purchase commercial goods. In some embodiments, combinations of in-system purchasing and external purchasing may provide the ability for users to purchase commercial goods.

Figure 4:
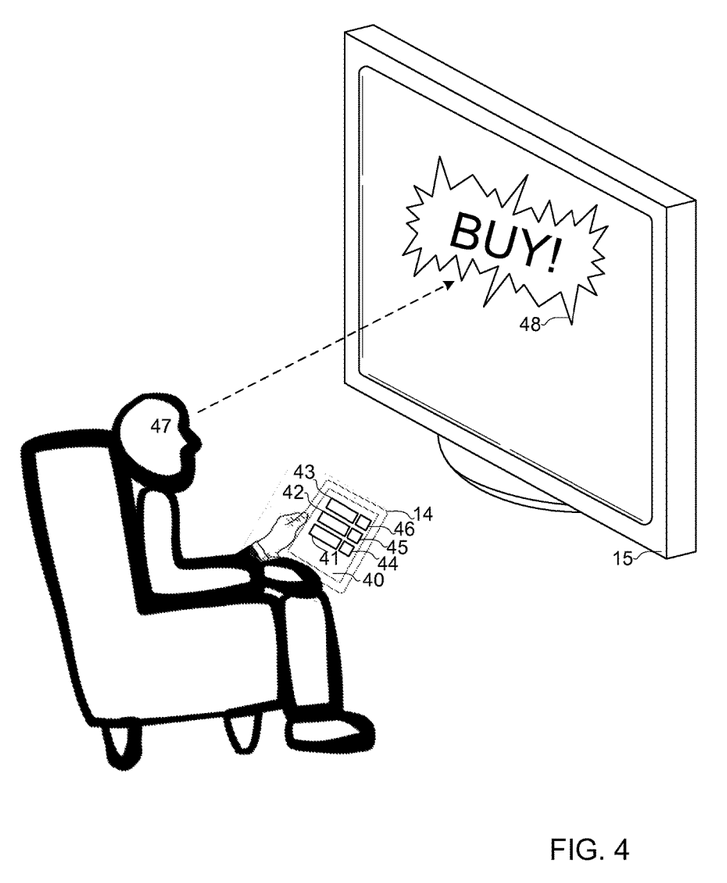
FIG. 4 illustrates a view of an exemplary user interface in accordance with one or more embodiments.

By way of illustration, FIG. 4 illustrates a view of a user interface 40 presented on client computing platform 14 (in this case a tablet, by way of non-limiting example). Client computing platform 14 is used by a user 47 who is watching an advertisement 48 on presentation device 15 (in this case a television, by way of non-limiting example). The particular advertisement 48 may be for a particular commercial good. Advertisement 48 may include sound, which may be captured by client computing platform 14 in FIG. 4. Based on the captured sound, the particular advertisement 48 and the particular commercial good may be determined, by virtue of the features described in this disclosure. One or more commercial sources, including a particular commercial source, for the particular commercial good may be determined and/or selected (commercial sources not shown in FIG. 4). User interface 40 may be presented through client computing platform 14 in response to advertisement 48 being presented on presentation device 15. Elements of user interface 40 may be implemented as fields configured to receive entry, selection, and/or confirmation from a user (e.g. user 47). The fields may include one or more of a text entry field, a set of selectable menu items, a selectable field, and/or other fields configured to receive entry, selection, and/or confirmation from the emergency operator. The number of elements, components, and/or (user-selectable) fields depicted in FIG. 4 is meant to be exemplary, and not limiting in any way. User interface 40 may be configured to present information to and/or enable interaction with user 47.

User interface 40 of FIG. 4 may include interface elements 41, 42, 43, 44, 45, 46, and/or other components and/or features. Interface elements 41, 42, 43, 44, 45, and 46 may be, e.g., an object, interface, and/or other items that a user may interact with, such as a menu of user-selectable options and/or actions for engaging the system. Interface elements 41, 42, and 43 may be informational elements, e.g. icons, images, text, animations, and/or combinations thereof. Interface elements 44, 45, and 46 may be action elements. For example, interface element 43 may depict a representation of the particular commercial good and/or the particular commercial source related to advertisement 48. For example, interface element 46 may, upon activation by user 47, effectuate a purchase of the particular commercial good depicted by interface element 43. In some embodiments, interface element 46 may, upon activation by user 47, effectuate presentation of information related to the particular commercial good depicted by interface element 43. In some embodiments, activation of an interface element may open a possibly external web page and/or redirect user 47 to a possibly external web page.

In some embodiments, interface elements 42 and 41 may depict representations of alternate commercial sources for the same particular commercial good as represented using interface element 43. Interface elements 45 and 44 may, upon activation by user 47, effectuate purchases of the particular commercial good at the particular commercial source depicted by interface element 42 and 41, respectively. Alternatively, and/or simultaneously, in some embodiments, interface elements 42 and 41 may depict representations of different commercial goods and/or different commercial sources related to advertisements other than advertisement 48. For example, interface elements 42 and 41 may depict representations of commercial goods related to previously presented advertisements. Interface elements 45 and 44 may, upon activation by user 47, effectuate purchases of the particular commercial good at the particular commercial source depicted by interface element 42 and 41, respectively.

The number of interface elements as depicted in FIG. 4 is exemplary, and not limiting in any way. In some embodiments, the number of informational elements and/or the number of corresponding action elements may be limited by a predetermined (and/or user-programmable) maximum number. For example, in some embodiments, the maximum number of depicted representations may be 3, 4, 5, 6, 7, 8, 9, 10, and/or another maximum number of depicted representations. In such a case, responsive to another advertisements being presented near the user, the user interface may be designed to remove the oldest representation to make place for the newest representation. In some embodiments, other replacement schemes may be used. For example, the user interface may be designed to learn which commercial goods are least likely and/or most likely to be of interest to the user, and use this knowledge as a basis for a replacement scheme. In some embodiments, the number of informational elements and/or the number of corresponding action elements may be limited by a predetermined (and/or user-programmable) time frame or span of time. For example, in some embodiments, the maximum time frame may be 10 minutes, 20 minutes, 30 minutes, 40 minutes, 60 minutes, 2 hours, 3 hours, 4, hours, 5 hours, 6 hours, 7 hours, 8 hours, and/or another maximum timeframe. In such a case, the user interface may be designed such that all representations for commercial goods that have been presented within the most recent time frame are depicted. Once the amount of time in the time frame has passed since a particular commercial good was presented, the representation thereof may be removed from the user interface. In some embodiments, combinations of these maximum number and maximum timeframe schemes may be used to determine which representations to depict in the user interface.

Referring to FIG. 1, purchase component 117 may be configured to effectuate purchases of commercial goods by users. In some embodiments, operation of purchase component 117 may be performed in response to receipt of user input interacting with a user interface of a client computing platform 14. In some embodiments, operation of purchase component 117 may include a payment solution, i.e. the ability to complete a financial transaction. In some embodiments, purchase component 117 may be configured to collect payments from users. In some embodiments, system 10 may cooperate with a company or service that handles payment transactions (e.g. through a bank, a credit card company, and/or other payment solutions). in such a case, source component 114 may be configured to favor commercial sources 17 that have particular terms with the company or service mentioned above over commercial sources 17 that have no such terms, or less favorable terms, and/or are otherwise less desirable to be selected from a compensation viewpoint.

In some embodiments, purchase component 117 may provide the ability for users to effectuate purchases within system 10, e.g. through confirmation of a financial transaction. In some embodiments, purchase component 117 may be configured to redirect and/or link users to external web pages and/or applications that provide the ability for users to effectuate purchases. In some embodiments, combinations of in-system purchasing and external purchasing may provide the ability for users to effectuate purchases.

Tracking component 118 may be configured to track, record, analyze, and/or process information regarding advertisements, including but not limited to occurrences of the presentation of an advertisement to a user and/or occurrences of the presentation of an advertisement in client computing platform 14. In some embodiments, tracking component 118 may be configured to track, record, analyze, and/or process information regarding the operation of presentation component 116, purchase component 117, and/or other components of system 10. For example, tracking component 118 may be configured to track redirections from the user interface to external web pages and/or applications that provide the ability for users to purchase commercial goods.

In some embodiments, tracking component 118 may be configured to determine preferences and/or habits of a particular user, including but not limited to what kinds of shows the user watches or listens to. Data gathered by tracking component 118 may be valuable, e.g. for advertisers.

Compensation component 119 may be configured to track, record, analyze, and/or process purchase information, including but not limited to information regarding purchases that are offered and/or completed through system 10. In some embodiments, compensation component 119 may be configured to determine compensations for any of the operations performed by system 10, including but not limited to the operations tracked by tracking component 118. For example, compensation component 119 may be configured to determine a compensation for determining a particular commercial source 17 as the commercial source for a particular commercial good.

In some embodiments, compensation component 119 may be configured to produce bills, invoices, payments, and/or other financial documents and/or messages to initiate the collection of payments and/or the disbursement of payments based on the determined compensations. Compensation component 119 may be configured to produce, generate, and/or transmit financial documents to initiate the distribution of payments based on the determined compensations for, e.g., commercial providers.

User parameter component 120 may be configured to obtain, receive, and/or determine user parameters associated with users and/or client computing platforms 14. The user parameters may be used by other computer program components, including, but not limited, to selection component 115. For example, selection component 115 may be configured to select a particular commercial source 17 from a set of commercial sources 17 based on one or more user parameters in combination with one or more source parameters. For example, in some embodiments, a selection may be based on comparing one or more geographical locations of individual commercial sources 17 with a home location and a professional location of a user. For example, in some embodiments, a selection may be based on a composite comparison involving the price of a particular commercial good including shipping cost, the income level of the user, and the purchase history of the user.

Figure 3:
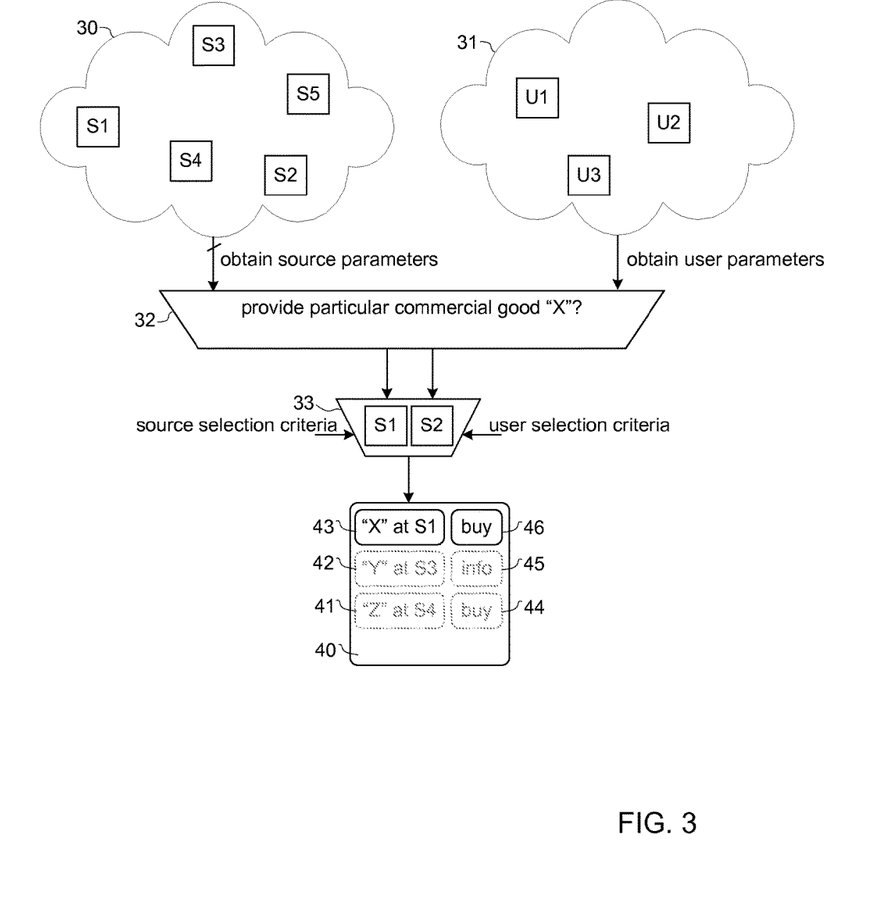
FIG. 3 illustrates steps for determining and/or selecting a commercial source of a particular commercial good, in accordance with one or more embodiments.

By way of non-limiting illustration, FIG. 3 illustrates steps for determining and/or selecting a commercial source 17 of a particular commercial good. Set of commercial sources 30 includes five commercial sources which are labeled S1, S2, S3, S4, and S5. Set of users 31 includes three users which are labeled U1, U2, and U3. Step 32 depicts a determination whether any of the commercial sources in set 30 offer a particular commercial good "X" for sale. Inputs for step 32 include source parameters that are obtained from set 30, user parameters that are obtained from set 31, and/or other information. Based on the determination in step 32, step 33 depicts the subsequent selection among commercial sources that offer commercial good "X," in this case commercial sources S1 and S2. Inputs for step 33 include source selection criteria (e.g. based on commercial source-specific parameters and/or commercial good-specific parameters, e.g. as obtained from set 30), user selection criteria (e.g. based on user parameters, e.g. as obtained from set 31), and/or other information. Based on the selection in step 33, user interface 40 depicts the presentation of a representation of commercial source S1 which offers to sell commercial good "X" (through interface element 43). Upon activation of action element 46, a purchase of commercial good "X" from commercial source S1 is effectuated. Previously presented commercial sources and commercial goods are depicted as interface element 42 (presenting a representation of commercial source S3 offering to provide information regarding commercial good "Y" upon activation of action element 45) and interface element 41 (presenting a representation of commercial source S4 offering to sell commercial good "Z" upon activation of action element 44).

System 10 may include one or more servers 11. Server(s) 11 may be configured to communicate with one or more client computing platforms 14. Server(s) 11 may be configured to communicate according to a client/server architecture, and/or according other architectures. Servers 11 may include search servers, ad servers, ad brokers, demand-side platforms, third-party platforms, and/or other servers.

Server(s) 11 may include physical electronic storage 60, one or more processors 20, and/or other components. Server(s) 11 may be configured to execute one or more computer program components. Physical electronic storage 60 may be referred to as electronic storage.

One or more processors 20 may be configured to provide information processing capabilities in system 10 and/or server 11. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some embodiments, processor 20 may include a plurality of processing units. These processing units may be physically located within the same device, or processor 20 may represent processing functionality of a plurality of devices operating in coordination (e.g., "in the cloud", and/or other virtualized processing solutions).

It should be appreciated that although components 111-120, are illustrated in FIG. 1 as being co-located within a single processing unit, in embodiments in which processor 20 includes multiple processing units, one or more of components 111-120 may be located remotely from the other components. The description of the functionality provided by the different components 111-120 described herein is for illustrative purposes, and is not intended to be limiting, as any of components 111-120 may provide more or less functionality than is described. For example, one or more of components 111-120 may be eliminated, and some or all of its functionality may be provided by other ones of components 111-120. As another example, processor 20 may be configured to execute one or more additional components that may perform some or all of the functionality attributed herein to one of components 111-120.

Electronic storage 60 of system 10 in FIG. 1 may comprise electronic storage media that stores information. The electronic storage media of electronic storage 60 may include one or both of system storage that is provided integrally (i.e., substantially non-removable) with server 11 and/or removable storage that is removably connectable to server 11 via, for example, a port (e.g., a USB port, a FireWire™ port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Electronic storage 60 may include virtual storage resources, such as storage resources provided via a cloud and/or a virtual private network. Electronic storage 60 may store software algorithms, information determined by processor 20, information received via client computing platforms 14, and/or other information that enable server 11 and system 10 to function properly. Electronic storage 60 may be separate components within system 10, or electronic storage 60 may be provided integrally with one or more other components of system 10 (e.g., processor 20).

Figure 2:
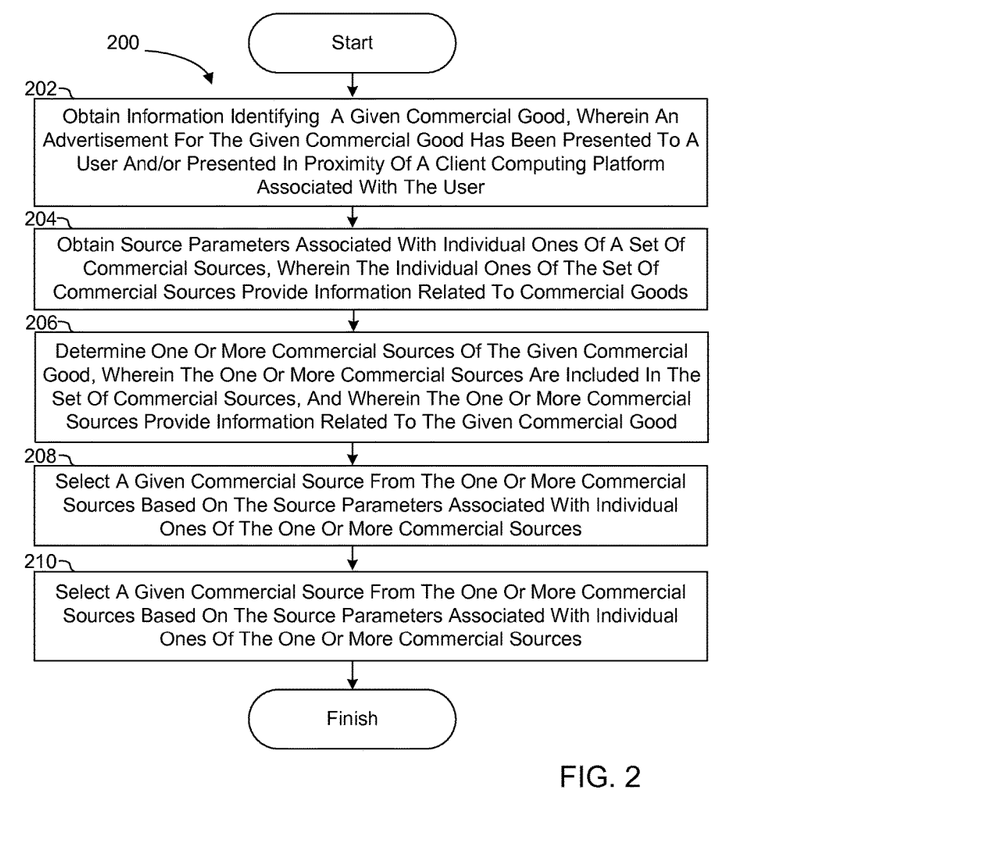
FIG. 2 illustrates a method for providing responses to advertising, in accordance with one or more embodiments.

FIG. 2 illustrates a method 200 for guiding user response to advertising. Regarding method 200, at an operation 202, information identifying a given commercial good is obtained. An advertisement for the given commercial good has been presented to the user and/or presented in proximity of the client computing platform. In some embodiments, operation 202 is performed by an information component the same as or similar to information component 111 (shown in FIG. 1 and described herein).

At an operation 204, source parameters associated with individual ones of a set of commercial sources are obtained. The individual ones of the set of commercial sources provide information related to commercial goods (and/or information related to offers to sell commercial goods. In some embodiments, operation 204 is performed by a source parameter component the same as or similar to source parameter component 113 (shown in FIG. 1 and described herein).

At an operation 206, one or more commercial sources of the given commercial good are determined. The one or more commercial sources are included in the set of commercial sources. The one or more commercial sources provide information related to the given commercial good and/or information related to offers to sell the given commercial good. In some embodiments, operation 206 is performed by a source component the same as or similar to source component 114 (shown in FIG. 1 and described herein).

At an operation 208, a given commercial source is selected from the one or more commercial sources based on the source parameters associated with individual ones of the one or more commercial sources. In some embodiments, operation 208 is performed by a selection component the same as or similar to selection component 115 (shown in FIG. 1 and described herein).

At an operation 210, a first presentation of a user interface is effectuated to the user on the client computing platform. The user interface includes a representation of the given commercial good and provides information related to the given commercial source. In some embodiments, operation 210 is performed by a presentation component the same as or similar to presentation component 116 (shown in FIG. 1 and described herein).

The operations of method 200 presented herein are intended to be illustrative. In some embodiments, method 200 may be accomplished with one or more additional operations not described, and/or without one or more of the operations discussed. Additionally, the order in which the operations of method 200 are illustrated in FIG. 2 and described herein is not intended to be limiting.

In some embodiments, method 200 may be implemented in one or more processing devices (e.g., a server, a digital processor, an analog processor, a digital circuit designed to process information, an analog circuit designed to process information, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Although the system(s) and/or method(s) of this disclosure have been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A network-based, computer-implemented system for identifying a commercial good or service based on an advertisement and for selecting a commercial source of the commercial good or service, comprising:
   a plurality of databases in digital communication with a network, the plurality of databases includes a local database and a remote database, each database of the plurality of databases includes a plurality of information sets, each information set is associated with a prescribed advertisement and includes time-frequency representations of sound from the prescribed advertisement and identification of the corresponding good or service of the advertisement;
   a client computing platform associated with at least one user, including a digital processor assembly and a digital memory assembly, the client computing platform further having the local database, the client computing platform having computer-readable instructions, to:
     capture sound digitally, via a microphone, presented to the client computing platform;
     convert the captured sound to a time-frequency representation on the client computing platform;
     transmit the time-frequency representation to a server through a network; and
     compare the time-frequency representation with the information in the local database;
   a server assembly in digital communication with the client computing platform via a network, the server assembly includes at least one physical processor configured, via computer-readable instructions, to:
     receive, from the client computing platform, the time-frequency representation;
     compare the received time-frequency representation with the information sets in the plurality of databases to determine a likelihood match (LM) values from between the received time-frequency representation and a comparable time-frequency representation from each of the plurality of databases, such that the comparisons on the plurality of databases are initiated at substantially the same time, in that the remote database is located remote of the client computing platform;
     identify the commercial good or service based on the comparison that is associated with the highest LM value from the comparison;
     determine one or more commercial sources pertaining to the identified commercial good or service;
     select a commercial source from the determined one or more commercial sources based on one or more pre-set parameters, the one or more pre-set parameters configured with a hierarchical and weighted disposition, the one or more pre-set parameters comprising of 1) pre-determined geographical area surrounding the client computing platform, 2) user data, 3) product availability, 4) language of the advertisement, 5) user-set preferences, 6) product pricing and 7) internal system preferences;
     determine a representation of the identified commercial good or service based on the selected commercial source;
     effectuate a first presentation of the representation of the commercial good or service on a user interface of the client computing platform, providing the ability for the at least one user to purchase the commercial good or service within the system;
     track whether the at least one user purchases the commercial good or service within the system or redirects to a location outside the system; and
     store the received time-frequency representation, the identified advertisement, the determined commercial source, the selected commercial source, and the tracked purchase.

2. The system of claim 1, wherein the processor is further configured to:
   determine compensation to be paid by the selected commercial source to a stakeholder associated with deployment of the system in exchange for the selection.

3. The system of claim 1, wherein the processor is further configured to, responsive to receipt of first user input interacting with the user interface of the client computing platform, effectuate a selection of the representation of the commercial good or service.

4. The system of claim 3, wherein the processor is further configured to, responsive to receipt of second user input interacting with the user interface of the client computing platform, effectuate a purchase by the user of the commercial good or service.

5. The system of claim 1, wherein the processor is further configured to identify the advertisement for the commercial good or service that has been presented by a sound-producing device that produces both video and sound.

6. The system of claim 1, wherein sound produced by a sound-producing device includes an audio stream.

7. The system of claim 1, wherein the user interface is configured to include a plurality of representations of commercial goods or services associated with different advertisements, wherein the plurality is limited by at least one of a predetermined maximum number of representations or a predetermined maximum span of time.

8. A method for determining and selecting a commercial source of a commercial good or service from at least one commercial source, the method comprising:
   storing in a plurality of databases in digital communication with a network, the plurality of databases includes a local database and a remote database, each database of the plurality of databases includes a plurality of information sets, each information set is associated with a prescribed advertisement and includes time-frequency representations of sound from the prescribed advertisement and identification of the corresponding good or service of the advertisement;
   receiving from the client computing platform, a time-frequency representation that is based on sound that was captured digitally, presented to the client computing platform and converted the captured sound to a time-frequency representation on the client computing platform;
   comparing the received time-frequency representation with the information sets in the plurality of databases to determine a likelihood match (LM) values from between the received time-frequency representation and a comparable time-frequency representation from each of the plurality of databases, such that the comparisons on the plurality of databases are initiated at substantially the same time, in that the remote database is located remote of the client computing platform;
   identifying the commercial good or service based on the comparison that is associated with the highest LM value from the comparison;
   determining one or more commercial sources pertaining to the identified commercial good or service;
   selecting a commercial source from the determined one or more commercial sources based on one or more pre-set parameters, the one or more pre-set parameters configured with a hierarchical and weighted disposition, the one or more pre-set parameters comprising of 1) predetermined geographical area surrounding the client computing platform, 2) user data, 3) product availability, 4) language of the advertisement, 5) user-set preferences, 6) product pricing, and 7) internal system preferences;
   determining a representation of the identified commercial good or service based on the selected commercial source;
   effectuating a first presentation of the representation of the commercial good or service on a user interface of the client computing platform, providing the ability for the at least one user to purchase the commercial good or service within the system;
   tracking whether the at least one user purchases the commercial good or service within the system or redirects to a location outside the system; and
   storing the received time-frequency representation, the identified advertisement, the determined commercial source, the selected commercial source, and the tracked purchase.

9. The method of claim 8, further comprising: storing information that includes a first user profile wherein a first client computing platform is associated with the first user, and the user profiles include: information related to advertisements for commercial goods and, the advertisements have been presented in proximity of the first user.

10. The method of claim 9, wherein the first user profile further includes demographical information that has been obtained through usage of the system by the first user, wherein the pre-set parameters further includes a demographical parameter that is related to the demographical information.

11. The method of claim 9, wherein the first user profile further includes temporal information regarding the time of day the first user has used the system, wherein the pre-set parameters further includes a temporal parameter that is related to the temporal information.

* * * * *